United States Patent Office 2,719,116
Patented Sept. 27, 1955

2,719,116

PHOTOCHEMICAL PREPARATION OF OXIMES

Bernard B. Brown, Grand Island, N. Y., assignor to Olin Mathieson Chemical Corporation, a corporation of Virginia No Drawing. Application March 19, 1954,
Serial No. 417,490

9 Claims. (Cl. 204—158)

This invention relates to improvements in a method for the manufacturing of oximes of cyclic ketones. These oximes are valuable intermediates for the manufacturing of superpolyamides.

In the copending application of Christoph Grundmann, Serial No. 299,020, filed July 15, 1952, it is disclosed that oximes of cyclic ketones can be prepared by reacting cyclic, hydro-aromatic hydrocarbons with nitrosylating agents in the presence of ultraviolet light derived from either a natural or an artificial source. This reaction can be carried out at ordinary or elevated temperatures but is preferably effected at a temperature within the range from about 5° to 60° C. Particularly where a gaseous nitrosylating agent is used the reaction is advantageosuly carried out at an elevated pressure.

In conducting the process of this copending application I have found that frequently a resinous coating is formed on the internal reactor walls which walls may be formed in part by the surfaces of the lamps where the lamps are inside the reactor or embedded in the reactor wall. This effect is particularly prevalent and undesirable when operating the process in a continuous-type reactor. In this operation as well as in batchwise procedures, the resinous coating causes undesirable decreases in lamp efficiency and effects lower conversion of the nitrosylating agents. Thus in conducting the process on a successful economic basis it is important to inhibit the formation of the resinous coating on the reactor walls.

In the present invention, I have found that if this reaction of the cyclic, hydro-aromatic compound to the oxime of a cyclic ketone can be conducted in the presence of an aliphatic carboxylic acid containing from 1 to about 4 carbon atoms or the chlorinated and fluorinated derivatives thereof, the deposition of the resinous coating on the reactor walls is entirely prevented or inhibited at least to a substantial degree. The inhibition of this coating effects greater lamp efficiency and increased conversion of the nitrosylating agent as compared with similar operations in which no inhibiting agent is employed.

Specific acids which fall within the aliphatic carboxylic acid inhibitors of my invention are formic acid, acetic acid, propanoic acids, butyric acids and their chlorinated and fluorinated derivatives. Of the unsubstituted acids I prefer to use formic acid. While acetic acid effectively inhibits the formation of the resinous coating its use is not as desirable as formic acid since the former does in certain instances tend to give reduced conversion of the nitrosylating agent compared with the results obtained when employing formic acid. Trichloroacetic acid is among the chlorinated derivatives of my acid inhibitors which can be employed but this acid also results in lower conversions in some instances. Among the fluorinated acids which can be employed are trifluoroacetic acid and perfluorobutyric acid.

The amount of acid inhibitor to be utilized in the present invention depends upon the particular acid selected and in all instances I use enough acid to inhibit the formation of a resinous coating to a substantial degree. The amount of inhibitor employed should give effective action and will in most instances be small compared with the amount of cyclic, hydro-aromatic compound present in the reactor. In general, the minimum amount of inhibitor to be employed will be at least about 0.5% by weight based upon the hydro-aromatic compound present in the reactor. The maximum amount of acid to utilize will also vary with the particular acid selected but ordinarily little advantage will be derived if the amount employed is more than that which is soluble in the reacting mixture.

I have found through several reactions conducted in the presence of my inhibitors that it is preferable to employ a saturated solution of the inhibitor in the reacting mixture. A saturated solution of formic acid in cyclohexane will contain from about 0.85 to 1.25% by weight depending upon the temperature of the reaction and the extent of mixing. In some instances when the hydro-aromatic compound is mixed with the inhibitor before being introduced into the reaction which is the usual and preferred procedure, the hydro-aromatic need not be completely pre-saturated with inhibitor to produce a saturated reaction mixture since upon addition of the nitrosylating agent the solubility of the inhibitor may be decreased. Thus if the hydro-aromatic be presaturated some of the inhibitor would salt-out upon the addition of the nitrosylating agent. This effect was observed when presaturating cyclohexane with formic acid.

Among the cyclic hydro-aromatic hydrocarbons which I can use are cyclopentane, methylcyclopentane, the dimethylcyclopentanes, cyclohexane, methylcyclohexane, the dimethylcyclohexanes, cycloheptane, methylcycloheptane, decahydronaphthalene, tetrahydronaphthalene, and so forth. Among the nitrosylating agents which I can employ are nitrosyl chloride, nitrosyl sulfuric acid, nitrosyl bromide, nitrosyl borofluoride, nitrosyl fluoride, and so forth.

In conducting the process of my invention utilizing formic acid as an inhibitor the reactor walls were clear of resinous coating even after runs of three to four hours duration. In reactions of cyclohexane and nitrosyl chloride, conversion of the nitrosylating agent was raised from the 45 to 50% of a thirty minute run level without an inhibitor to 60 to 65% with the formic acid inhibitor in the same length of time. In the inhibited reaction no resinous coating was formed on the reactor walls; however, in the run with no inhibitor, a coating deposited on the walls. The use of formic acid is further advantageous since the separation of the oxime product from the reacting mixture, for instance containing cyclohexane, is simplified by the solubility of the oxime or its hydrochloride in the formic acid with which it forms an oil insoluble in cyclohexane. The oxime product can be continuosly extracted from the effluent stream by means of a 10% caustic solution. However, the nature of the formic acid-oxime oil makes a phase separation from the cyclohexane practicable.

Although as noted, the reaction may be conducted at ordinary or elevated temperatures, I have found it advantageous to conduct the reaction within the range of about 30 to 40° C. even though cooling towers may be required to maintain these temperatures. Attempts to operate at reactor temperatures of about 50 to 55° C. and thus eliminate cooling towers proved less advantagous as conversion levels dropped considerably.

When utilizing acetic acid as the inhibitor in my process a minimum of 15% concentration proved excellent in preventing an accumulation of oil or resinous coating on the reactor walls. In operations using an ultra-violet lamp the yields of oxime formed in the presence of acetic acid were low. However, these low yields can be traced to the reaction of the acetic acid with the nitrosylating agent, e. g., nitrosyl chloride, and are not encountered in reactions conducted in ordinary light in which acetic acid and the nitrosyl chloride are unreactive.

In operating my process on an economic, continuous basis the unreacted cyclohexane should be recycled to the principal reaction zone. I have found that the unreacted cyclohexane separated from the reacting mixture contains unsaturated and oxygenated impurities which impart to it a green or dark color and which must be removed or cleaned-up before the cyclohexane can be recycled if the conversion levels are not to be deleteriously affected. These impurities may be removed by following a number of procedures. For instance, once-used cyclohexane was shaken with small portions of sulfuric acid until the acid layer was colorless and a run with this cyclohexane using formic acid as the inhibitor gave a conversion of about 55%. A similar operation using dried cyclohexane which had been allowed to stand two to three days until colorless and then separated from the small amount of heavier dark oil and water which had settled out also gave 55% conversion. However, the use in a similar reaction of dry once-through green colored cyclohexane resulted in a conversion of only about 35%.

The following examples illustrate in detail the specific embodiments of the process which I have discovered and are to be considered to be by way of illustration rather than limitation.

*Example I*

To a continuous type reactor was passed a solution of 1.15% by weight of nitrosyl chloride in a 1% trichloroacetic acid-cyclohexane solution at a temperature between 22° and 28° C. The solution had a residence time of 9.5 minutes. In the reactor the solution was subjected to light from a Hanovia A–H 9 mercury vapor lamp having an effective length of 20 cm. and an effective width of 1.5 cm. During an operating time of 150 minutes 2600 cc. of the feed passed through the reactor yielding a turbid, almost colorless solution from which 33 cc. of cyclohexanone oxime hydrochloride separated as an oil. No coating occurred on the reactor walls during that time. The crude oxime hydrochloride was separated from the excess cyclohexane by decantation and was treated with 50 cc. of ether which caused spontaneous crystallization. The yield was 27 grams of cyclohexanone oxime hydrochloride. A further portion of three grams of oxime was isolated from the cyclohexane and ether mother liquors by extracting them from a 2N-sodium hydroxide solution and acidifying to a pH of 5. The total yield was 45% by weight calculated, on the nitrosyl chloride charged.

In an experiment analogous to that of Example I under the same conditions but in the absence of trichloroacetic acid in the feed, after 2770 cc. of the nitrosyl chloride-cyclohexane mixture had passed through the reactor in 165 minutes, the walls of the reaction chamber were completely coated with a dark brown resin. The solution coming out of the reactor was bluish green and much gas was evolved during the reaction which indicated considerable side reactions had been effected. The overall yield of cyclohexanone oxime was only 14.8% by weight based on the nitrosyl chloride.

*Example II*

In an experiment similar to that of Example I but in which a nitrosyl chloride-cyclohexane solution was saturated with formic acid, cyclohexanone oxime hydrochloride was produced with 64% conversion of the cyclohexane and without coating the reactor walls. In this run the NOCl concentration analyzed 0.81% and the reaction temperature was maintained from 30 to 35° C. The residence time of the feed was 8.5 minutes and the total time of the run was 30 minutes.

In a run similar to that of Example II but in which no formic acid was utilized the conversion of the cyclohexane was only 47% and the reactor wall became coated with a solid material. In this experiment, the NOCl concentration was 0.84% while the residence time was 8.8 minutes. The total run time was 31 minutes.

*Example III*

In an experiment similar to that of Example I but in which a nitrosyl chloride-cyclohexane solution contained 15% of acetic acid, cyclohexanone oxime hydrochloride was produced without coating the reactor walls.

I claim:

1. A process for the preparation of oximes of cyclic ketones which comprises reacting in a reaction zone a cyclic, hydro-aromatic hydrocarbon with a nitrosylating agent in the presence of ultraviolet light, the reaction mixture containing an effective amount of a material for inhibiting the formation of a resinous coating on the reactor walls selected from the group consisting of aliphatic carboxylic acids, chlorinated derivatives of aliphatic carboxylic acids, and fluorinated derivatives of aliphatic carboxylic acids, said aliphatic carboxylic acids containing from one to about four carbon atoms.

2. The process as in claim 1 in which the reacting mixture is saturated with the inhibiting material.

3. The process as in claim 1 in which the reaction is effected at a temperature from about 30 to 40° C.

4. The process as in claim 1 in which the inhibiting material is formic acid.

5. The process as in claim 1 in which the inhibiting material is acetic acid.

6. The process as in claim 1 in which the inhibiting material is trichloroacetic acid.

7. The process as in claim 1 in which the hydrocarbon is cyclohexane and the nitrosylating agent is nitrosyl chloride.

8. A process for the preparation of cyclohexanone oxime which comprises reacting in a reactor cyclohexane with nitrosyl chloride in the presence of ultraviolet light at a temperature from about 30 to 40° C., the reacting mixture being saturated with formic acid to inhibit formation of a resinous coating on the reactor walls.

9. A process for the preparation of cyclohexanone oxime which comprises continuously reacting in a reactor cyclohexane with nirtosyl chloride in the presence of ultraviolet light at a temperature from about 30 to 40° C., the reacting mixture being saturated with formic acid to inhibit formation of a resinuous coating on the reactor walls, separating the unsaturated and oxygenated impurities from the unreacted cyclohexane, and recycling the resulting cyclohexane to the reactor.

References Cited in the file of this patent

FOREIGN PATENTS 992,772     France _____ July 11, 1951